United States Patent Office 2,722,255
Patented Nov. 1, 1955

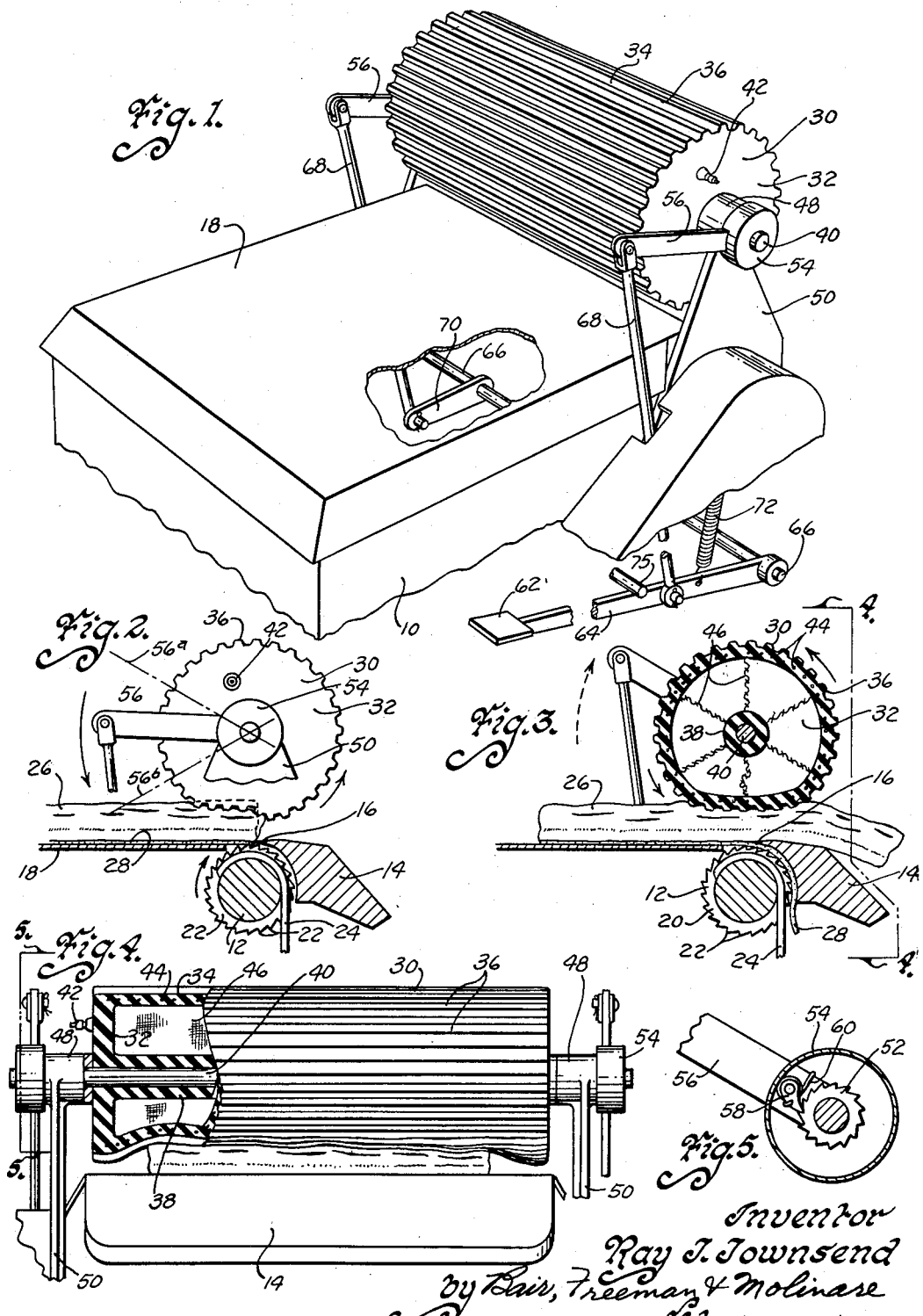

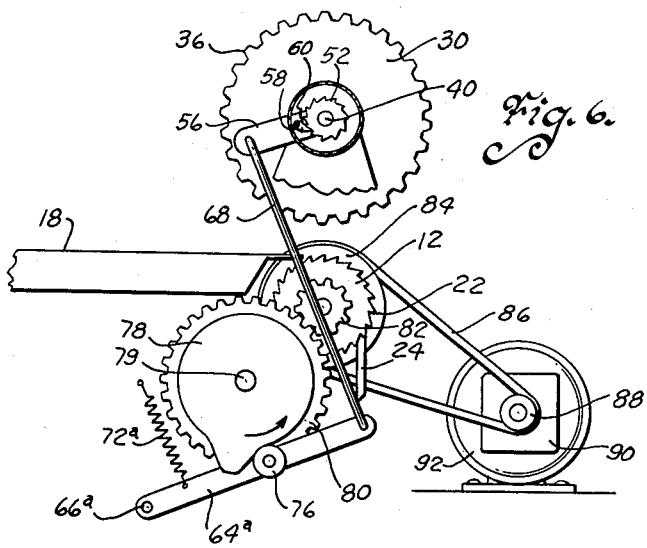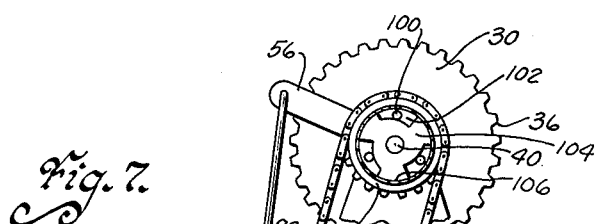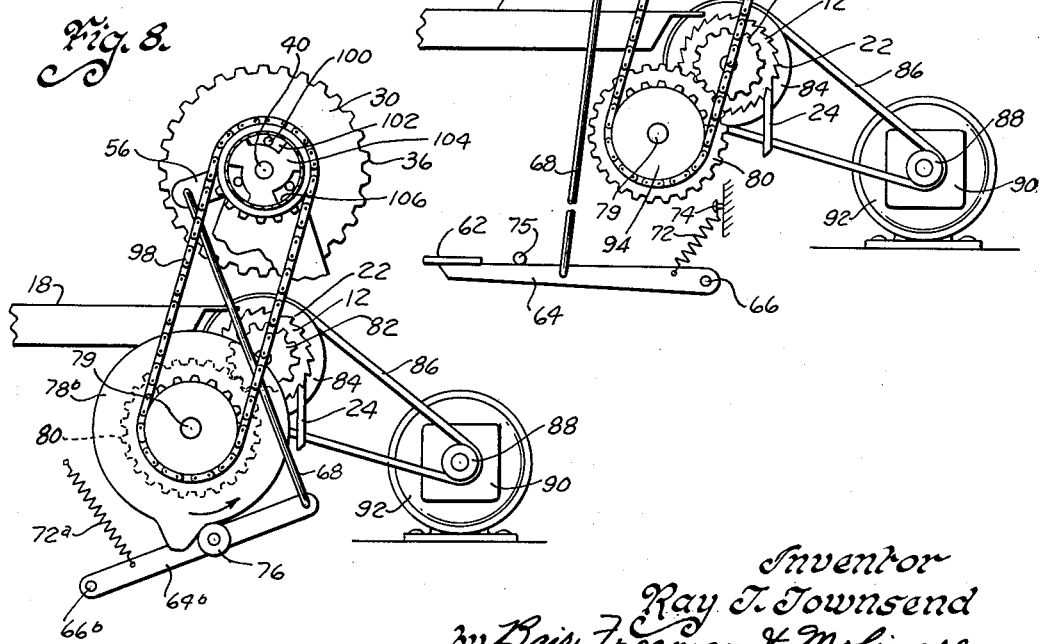

2,722,255

HOLD DOWN ATTACHMENT FOR SKINNING MACHINE

Ray T. Townsend, Des Moines, Iowa, assignor to Townsend Engineering Company, Des Moines, Iowa, a corporation of Iowa Application July 7, 1951, Serial No. 235,585

17 Claims. (Cl. 146—130)

This invention relates to hold-down attachment for skinning machines and particularly one which is in the form of a resilient roller having a corrugated or roughened surface, the roller being preferably inflated with air in order to uniformly and effectively engage the entire surface of a piece of meat such as a slab of bacon being skinned in a skinning machine.

Another object is to provide the hold-down roller with means to speed up its rotation when a piece of meat to be skinned is inserted between the hold-down roller and a feed roller in order to bend down the advance edge of the piece of meat and thereby insure that the advance edge of the skin will be fed properly between the skinning blade and the feed roller.

Still another object is to provide either manually or automatically-operated means for speeding up the rotation of the hold-down roller to effect the bending action referred to in the preceding object.

A further object is to provide a hold-down roller which may be mounted for free rotation and thereby rotated by the piece of meat itself or which may be driven simultaneously with the feed roller if desired.

Still a further object is to provide in the driven type of hold-down roller a means for automatically speeding up its rotation at timed intervals during which speed-up time the operator may insert a fresh piece of meat to be skinned.

An additional object is to provide a hold-down roller which is so designed as to impart substantially equal pressure throughout its extent on the piece of meat and specifically to provide a tubular inflated roller supported at its ends and having intermediate its ends collapsible connections between spaced points of its periphery and a shaft on which the hold-down roller is mounted so as to provide the substantially equal pressure mentioned.

With these and other objects in view, my invention consists in the construction, arrangement and combination of the various parts of my hold-down attachment whereby the objects contemplated are attained, as hereinafter more fully set forth, pointed out in my claims, and illustrated in the accompanying drawings, wherein:

Figure 1 is a perspective view of the upper portion of a skinning machine showing my hold-down attachment mounted thereon.

Figure 2 is an end view of the hold-down attachment and a sectional view of a portion of the skinning machine showing a slab of bacon being fed to skinning position.

Figure 3 is a vertical sectional view through both the hold-down roller and the skinning machine showing the slab of bacon being skinned.

Figure 4 is a front elevation of the hold-down attachment and a portion of the skinning machine as on the indicated line 4—4 of Figure 3.

Figure 5 is an enlarged vertical sectional view on the line 5—5 of Figure 4 showing part of the mechanism for accomplishing speed-up of the hold-down roller at the beginning of a meat feeding operation.

Figure 6 is an end view of a portion of the skinning machine showing a modified construction in which the speed-up mechanism for the hold-down roller is operated automatically instead of manually as in Figures 1 to 5.

Figure 7 is a similar view showing the hold-down roller automatically driven instead of free to rotate as in Figures 1 to 6 and showing a pedal means for speeding up the rotation of the hold-down roller at the beginning of a meat-feeding operation; and Figure 8 is a modification similar to Figure 7 except showing the automatic speed-up means of Figure 6 for the hold-down roller instead of the pedal means of Figure 7.

On the accompanying drawings I have used the reference numeral 10 to indicate in general the housing of a skinning machine such as one of the type shown in my Patent No. Re. 23,222 of April 25, 1950. That patent discloses also a specific construction of skinning machine including a feed roller 12, a pressure shoe 14 having a leading edge 16 serving as a skinning blade (or a separate skinning blade may be attached to the pressure shoe) and a feed table 18. The patent also shows that the feed roller 12 is grooved as at 20 and is provided with teeth 22 for feeding the skin between the feed roller and the pressure shoe 14, strippers 24 being provided in the grooves for stripping the skin from the roller as shown in Figure 3. On the present drawings the meat is shown at 26 and the skin at 28.

The main element of my hold-down attachment is a hold-down roller 30 which is of resilient construction, being made of rubber or similar material. The roller is preferably of tubular construction and inflated with air. As illustrated specifically, the roller comprises a pair of end walls 32, a cylindrical periphery 34 which is roughened or provided with corrugations 36, and a hub portion 38 which may be vulcanized or otherwise suitably secured to a shaft 40. A tire valve 42 may be provided in one of the end walls 30 for affording the connection of a tire pump or compressed air hose chuck for inflating the hold-down roller 30 to the proper degree.

The cylinder 34 may be suitably reinforced with fabric or metallic cables as indicated at 44 in Figures 3 and 4 and collapsible connections are provided between spaced points around the periphery of the cylinder and the hub 38 as indicated at 46. These may be formed of canvas or other fabric and their purpose will hereinafter appear.

The shaft 40 is mounted for free rotation in Figures 1 to 6 in bearings 48. These may be formed on brackets 50 attached to the sides of the housing 10. At each end of the shaft 40, a ratchet wheel 52 is provided surrounded by a ratchet housing 54, and a lever 56 is rotatable on the shaft 40 and extends through and out of the housing 54 as shown in Figure 5. The lever 56 carries a pivoted pawl 58 for coaction with the ratchet wheel 52. The pawl is spring urged to engage the ratchet wheel by means of a spring 60.

The levers 56 are manually operated in Figures 1 to 5 and 7 by a foot pedal 62 on a lever 64 supported on a rock shaft 66. A link 68 extends from the lever 64 to one of the levers 56 and a similar link 68 extends from a second lever 70 also mounted on the rock shaft 66 to the other lever 56 as shown in the broken away portion of the feed table 18 in Figure 1. The rock shaft 66 is normally rotated in a clockwise direction by a spring 72 which may be connected to a projection 74 of the housing 10 as shown in Figure 7. The spring pulls the lever 64 up against a stationary stop 75 extending also from the housing 10 or some suitable part of the skinning machine.

In Figure 6 a modification is shown in which the levers 56 are operated by a rock shaft 66a which is mechanically driven instead of manually operated. By way of illustration, a lever 64a is shown connected to the rock shaft and carries a roller 76 for coaction with a cam 78 geared through a gear 80 and a pinion 82 to the feed roller 12. The feed roller in turn is driven by a pulley 84 and a belt 86 from a pulley 88 on a gear reducer 90. An electric motor or the like 92 drives the gear reducer 90 so that the feed roller 12 is driven at the proper speed.

A further modification is shown in Figure 7 wherein the hold-down roller 30, instead of being free to rotate is driven by the shaft 79 of Figure 6. For this purpose a sprocket 94 is provided on the shaft. A second sprocket 96 is provided on the hold-down roller shaft 40 and a chain 98 operatively connects the two together. The connection between the sprocket 96 and the hold-down roller 30 is preferably of the "free wheeling" type provided with balls or rollers 100 in cam slots 102 of a hub 104 on the shaft 40, the rollers contacting an internal drum surface 106 of the sprocket 96. With such an arrangement, it is possible to drive the hold-down roller 30 at a constant speed yet whenever desirable to speed up the rotation.

The speed-up action of the driven hold-down roller 30 is accomplished manually in Figure 7 by depressing the foot pedal 62 as already as described in connection with Figures 1 to 5 or may be accomplished automatically by the arrangement shown in Figure 8 wherein the levers 56 are driven by a rock shaft 66b, a lever 64b and a cam 78b, in substantially the same manner as disclosed in Figure 6.

*Practical operation*

In the operation of my hold-down attachment for skinning machines, considering first the form shown in Figures 1 to 5, when a slab of bacon or the like 26 is being skinned as in Figure 3, the feed roller 12 gripping the skin 28 feeds the slab through the machine. The hold-down roller 30 is in contact with the slab and due to the resiliency of the roller will accommodate varying thicknesses of the slab as shown particularly in Figure 4. There will be some deformation of the lower portion of the roller as shown in Figure 3 during this operation and the friction between the meat and the hold-down roller will rotate the roller. However when it is desirable to feed the next slab of bacon into the machine, it is also desirable to bend down the advance edge of the slab as from the dotted position of Figure 2 to the solid line position thereof.

This may be accomplished by stepping on the pedal 62 which swings the lever 56 from its upper position 56a in Figure 2 toward its lower position 56b. The pawls 58 during this operation engage teeth of the ratchet wheels 52 for accomplishing the rotation of the hold-down roller, yet permit the roller to rotate freely thereafter with the mechanism 52–58 ratcheting. The roughened or corrugated surface 36 of the cylindrical portion 34 of the hold-down roller 30 grips the advance marginal portion of the slab 26 and tends to feed it through the machine faster than the tendency of the feed roller 12, with the resultant action being a bending down of the advance edge of the slab as already referred to and as shown by solid lines in Figure 2. As soon as the skinning edge 16 enters between the skin and the meat and the slab is well started in the skinning operation, the pedal 62 may be released and the roller 30 will thereafter be driven by the movement of the slab as already referred to.

To eliminate the necessity of the operator having to step on the pedal 62, the speed-up action of the hold-down roller may be done automatically as in Figure 6 by gearing the cam 78 to the feed roller 12 and having the lobe of the cam engage the roller 76 a short time after a complete bacon slab has passed through the machine. The operator then merely has to feed the slabs into the machine. By observing the arms 56 and noting when they start to move downwardly, he is warned to push the slab into position as in Figure 2 and the hold-down roller 30 will then automatically bend the advance edge of the slab downwardly as desired.

It may be desirable, especially in operating on relatively thick and heavy slabs of bacon, to mechanically rotate the hold-down roller 30 as in Figure 7 for more efficient feeding of the slab being skinned. The operative connections 28, 80, 94, 96 and 98, 100 and 102 are designed such the the peripheral speed of the hold-down roller and the feed roller are substantially the same. When the bacon slab is inserted in the position of Figure 2, the operator may step on the pedal in Figure 7 to speed up the rotation of the hold-down roller which speed-up, of course, is permitted by the free-wheeling connection 100—102.

As another alternative, in Figure 8 instead of manual speed-up, automatic speed-up can be provided. From the foregoing specification, it will be obvious that I have provided a hold-down attachment in the form of a resilient roller which is designed for effective and efficient cooperation with a slab of meat for holding it properly in position while skinning the same in a skinning machine. Several modifications are shown which are designed to increase the efficiency of the hold-down roller where found necessary and this relates particularly to the speed-up action for the purpose of bending down the advance edge of the meat to properly start the skinning action.

Some changes may be made in the construction and arrangement of the parts of my attachment without departing from the real spirit and purpose of my invention, and it is my intention to cover by my claims any modified forms of structure or use of mechanical equivalent which may be reasonably included within their scope.

I claim as my invention:

1. In a hold-down attachment for skinning machines, a resilient hold-down roller provided with a corrugated surface, means for mounting said roller for free rotation above the feed roller and skinning blade of a skinning machine, and pedal-operated means for temporarily imparting rotation to said hold-down roller when a piece of meat to be skinned is interposed between said feed roller and said hold-down roller to bend the meat toward said feed roller.

2. In a hold-down attachment for skinning machines, a hold-down roller of tubular construction having air under pressure therein, means for mounting said roller for free rotation above the feed roller and skinning blade of a skinning machine, said means comprising a shaft having collapsible connections with spaced points around the periphery of said hold-down roller, and pedal-operated means for momentarily imparting rotation to said hold-down roller when a piece of meat to be skinned is interposed between said feed roller and said hold-down roller to insure that the advance edge of the skin passes between said skinning blade and said feed roller.

3. In a hold-down attachment for skinning machines, a resilient hold-down roller mounted for free rotation above the feed roller and skinning blade of a skinning machine, said hold-down roller being rotated by a slab of meat passing through the machine under rotation of the feed roller thereof, and pedal-operated ratchet means for imparting additional rotation to said hold-down roller when a piece of meat to be skinned is fed to the machine.

4. In a hold-down attachment for skinning machines, a resilient hold-down roller, means for mounting said roller for rotation above the feed roller and skinning blade of a skinning machine, means for simultaneously imparting rotation to said feed roller and said hold-down roller for feeding meat to be skinned to said skinning blade, and pedal-operated means to speed up the rotation of said hold-down roller when a piece of meat to be skinned is interposed between said feed roller and said hold-down roller to insure that the advance edge of the skin passes between said skinning blade and said feed roller.

5. In a hold-down attachment for skinning machines, a hold-down roller of tubular construction having air under pressure therein, said roller being provided with a roughened surface, means for mounting said roller above the feed roller and skinning blade of a skinning machine, said means comprising a shaft, collapsible connections between spaced points around the periphery of said hold-down roller and said shaft, means for simultaneously imparting rotation to said feed roller and said hold-down roller for feeding meat to be skinned to said skinning blade, and pedal-operated means to speed up the rotation of said hold-down roller when a piece of meat to be skinned is interposed between said feed roller and said hold-down roller to bend the meat toward said feed roller.

6. In a hold-down attachment for skinning machines, a hold-down roller of tubular construction having air under pressure therein, said roller being provided with a roughened surface, means for mounting said roller above the feed roller and skinning blade of a skinning machine, means for simultaneously imparting rotation to said feed roller and said hold-down roller for feeding meat to be skinned to said skinning blade, and pedal-operated means to speed up the rotation of said hold-down roller when a piece of meat to be skinned is interposed between said feed roller and said hold-down roller.

7. In a skinning machine, a feed roller for unskinned meat, a skinning blade for parting the skin from the meat, a hold-down roller of tubular construction having air under pressure therein, said roller being provided with a roughened surface, means for mounting said roller above said feed roller and skinning blade, said means comprising a shaft, collapsible connections between spaced points around the periphery of said hold-down roller and said shaft, means for simultaneously imparting substantially equal rotation to said feed roller and said hold-down roller for feeding meat to be skinned to said skinning blade, and means operable simultaneously with the rotation of said feed roller to speed up the rotation of said hold-down roller relative to said feed roller when a piece of meat to be skinned is interposed between said feed roller and said hold-down roller.

8. In a skinning machine, a feed roller for unskinned meat, a skinning blade for parting the skin from the meat, a hollow hold-down roller having air under pressure therein, and provided with a corrugated surface, means for mounting said roller for rotation above said feed roller and skinning blade, said means comprising a shaft, collapsible connections between spaced points around the periphery of said hold-down roller and said shaft, means for simultaneously imparting rotation to said feed roller and said hold-down roller at substantially equal speeds for feeding meat to be skinned to said skinning blade, and means operable simultaneously with the rotation of said feed roller to speed up the rotation of said hold-down roller relative thereto periodically.

9. In a skinning machine, a feed roller for unskinned meat, a skinning blade for parting the skin from the meat, a hollow hold-down roller having air under pressure therein and provided with a corrugated surface, means for mounting said roller for rotation above said feed roller and skinning blade, means for simultaneously imparting rotation to said feed roller and said hold-down roller for feeding meat to be skinned to said skinning blade, and means operable simultaneously with the rotation of said feed roller to speed-up the rotation of said hold-down roller to a faster-than-normal feeding rate while said feed roller is kept at the normal feeding rate.

10. In a skinning machine, a feed roller for unskinned meat, a skinning blade for parting the skin from the meat, a hold-down roller of tubular construction having air under pressure therein, means for mounting said hold-down roller above said feed roller and skinning blade, means for driving said hold-down roller from said feed roller, and cam means driven from said feed roller for temporarily speeding up the rotation of said hold-down roller relative to said feed roller after predetermined rotation of said feed roller to insure that the advance edge of the skin on the meat being skinned enters properly between said skinning blade and said feed roller.

11. In a skinning machine, a feed roller for unskinned meat, a skinning blade for parting the skin from the meat, a resilient hold-down roller of tubular construction having air under pressure therein, and means for mounting said roller for rotation above said feed roller and skinning blade, said means comprising a shaft having collapsible nonextensible connections with spaced points around the periphery of said hold-down roller.

12. In a skinning machine, a feed roller for unskinned meat, a skinning blade for parting the skin from the meat, a resilient cylindrical hold-down roller provided with a corrugated or roughened surface, means for mounting said roller for rotation above said feed roller and skinning blade, and means for momentarily imparting rotation to said hold-down roller at a rate of speed in excess of the normal feeding rate by said feed roller when a piece of meat to be skinned is interposed between said feed roller and said hold-down roller to bend the meat toward said feed roller and insure that the advance edge of the skin passes between said skinning blade and said feed roller.

13. In a skinning machine, a feed roller for unskinned meat, a skinning blade for parting the skin from the meat, a resilient hold-down roller of tubular construction having air under pressure therein, means for mounting said roller for rotation above said feed roller and skinning blade, said means comprising a shaft, collapsible connections between spaced points around the periphery of said hold-down roller and said shaft, and means for temporarily imparting rotation to said hold-down roller when a piece of meat to be skinned is interposed between said feed roller and said hold-down roller, said means imparting rotation such that the meat engaging surface of the hold-down roller travels faster than the normal surface speed of the meat piece to bend the meat toward said feed roller and insure that the advance edge of the skin passes between said skinning blade and said feed roller.

14. In a skinning machine, a feed roller for unskinned meat, a skinning blade for parting the skin from the meat, a shaft, a hold-down roller thereon of tubular resilient construction having air under pressure therein, flexible collapsible means connecting the tubular portion of said roller with said shaft to determine the maximum diameter thereof, said shaft mounting said hold-down roller for rotation above said feed roller and skinning blade by contact of the meat therewith, and means for momentarily imparting rotation to said hold-down roller when a piece of meat to be skinned is interposed between said feed roller and said hold-down roller.

15. In a skinning machine, a feed roller for unskinned meat, a skinning blade for parting the skin from the meat, a hollow resilient hold-down roller of elongated tubular shape having air under pressure therein, said roller having a roughened surface, means for mounting said roller for free rotation above said feed roller and skinning blade by contact of the meat therewith, and means for temporarily imparting rotation to said hold-down roller at a greater surface speed than the surface speed of said feed roller when a piece of meat to be skinned is interposed between said feed roller and said hold-down roller thereby to bend down the advance edge of the meat.

16. In a skinning machine, a feed roller for unskinned meat, a skinning blade for parting the skin from the meat, a resilient hold-down roller provided with a roughened surface, means for mounting said roller for rotation above said feed roller and skinning blade, said hold-down roller being adapted for normal rotation by said feed roller through the interposition of a piece of meat between the two, and means for temporarily imparting higher-than-normal rotational speed to said hold-down roller when a piece of meat to be skinned is interposed between said feed roller and said hold-down roller to insure that the advance edge of the skin passes between said skinning blade and said feed roller.

17. In a skinning machine, a feed roller for unskinned meat, a skinning blade for parting the skin from the meat, a resilient cylindrical air inflated hold-down roller provided with a roughened surface, means for mounting said hold-down roller for rotation above said feed roller and skinning blade, means for limiting the cylindrical surface of said hold-down roller to cylindrical formation, said means permitting partial collapse of any portion of said hold-down roller engaging a piece of meat between said rollers, and means for rotating said hold-down roller at approximately the same surface speed as the surface speed of said feed roller.

References Cited in the file of this patent

UNITED STATES PATENTS

| | | |
|---|---|---|
| 725,971 | Kling | Apr. 21, 1903 |
| 866,354 | Gill | Sept. 17, 1907 |
| 1,427,000 | Lewinski | Aug. 22, 1922 |
| 1,847,536 | Pruefer | Mar. 1, 1932 |
| 2,020,645 | Hook | Nov. 12, 1935 |
| 2,173,336 | Lamere et al. | Sept. 19, 1939 |
| 2,265,380 | Maginn | Dec. 9, 1941 |
| 2,539,692 | Hickman et al. | Jan. 30, 1951 |
| 2,607,072 | Johnson | Aug. 19, 1952 |

FOREIGN PATENTS

| | | |
|---|---|---|
| 4,413 | Great Britain | 1896 |
| 611,911 | Germany | Apr. 12, 1935 |